(12) United States Patent
van Quickelberge

(10) Patent No.: US 8,154,592 B2
(45) Date of Patent: Apr. 10, 2012

(54) DEVICE AND METHOD FOR INSPECTING FAST REPETITIVE EVENTS OF DEFINED DURATION

(75) Inventor: Luc van Quickelberge, Ghent (BE)

(73) Assignee: Tesin NV, Sint-Denijs-Westrem (BE)

( * ) Notice: Subject to any disclaimer, the term of this patent is extended or adjusted under 35 U.S.C. 154(b) by 782 days.

(21) Appl. No.: 12/064,847

(22) PCT Filed: Aug. 30, 2006

(86) PCT No.: PCT/EP2006/065813
§ 371 (c)(1),
(2), (4) Date: Mar. 21, 2008

(87) PCT Pub. No.: WO2007/025985
PCT Pub. Date: Mar. 8, 2007

(65) Prior Publication Data
US 2008/0232766 A1    Sep. 25, 2008

(30) Foreign Application Priority Data

Aug. 31, 2005   (EP) ..................................... 05107960

(51) Int. Cl.
*H04N 7/18* (2006.01)
*H04N 9/04* (2006.01)
*H04N 5/222* (2006.01)
(52) U.S. Cl. ................. 348/92; 348/207.99; 348/333.11
(58) Field of Classification Search ............. 348/208.16, 348/222.1, 295
See application file for complete search history.

(56) References Cited

U.S. PATENT DOCUMENTS 4,496,995 A  *  1/1985  Colles et al. ................... 386/233
(Continued)

FOREIGN PATENT DOCUMENTS

DE   44 29 966 C1   1/1996
EP     351 558 A2   1/1990

OTHER PUBLICATIONS

"Use of Kodak Ektapro High-Speed Digital Cameras in Laryngoscopy", Gregory C. Burnett, Rebecca Leonard, Internet Article (Appendix B), Dec. 24, 2004—Retrieved from Internet: URL:http://web.archive.org.web/20041224083221/http://speech.11n1.gov/thesis/b.htm [retrieved on Jan. 25, 2007].

*Primary Examiner* — Lin Ye
*Assistant Examiner* — John H Morehead, III
(74) *Attorney, Agent, or Firm* — Sughrue Mion, PLLC

(57) ABSTRACT

The invention relates to a device for inspecting fast repetitive events of defined duration, comprising image recording means for recording successive images of the repetitive event, and image reproduction means for providing a synchronized slow motion representation of said successive images of the repetitive event during the total duration of the repetitive event or a multiple thereof, whereas said image recording means comprise high frame rate image recording means for digitally recording a limited burst of successive images of a fraction of one event, and the device comprises software means to provide synchronized image recording of said fraction of one event and slow motion representation of said limited burst of successive images during the total duration of said one event or multiple thereof, and to an inspection method for such repetitive events involving high frame rate image recording of a limited burst of successive images of a fraction of one event, and synchronized slow motion representation of said limited burst of successive images during the total duration of said one event or multiple thereof.

24 Claims, 1 Drawing Sheet

U.S. PATENT DOCUMENTS

| | | | |
|---|---|---|---|
| 4,922,337 A | 5/1990 | Hunt et al. | |
| 5,251,027 A * | 10/1993 | LaBeau | 348/22 |
| 5,428,392 A | 6/1995 | Castro et al. | |
| 5,625,412 A * | 4/1997 | Aciu et al. | 348/222.1 |
| 7,557,833 B2 * | 7/2009 | Okawa | 348/220.1 |
| 2002/0021364 A1 * | 2/2002 | Asada et al. | 348/312 |
| 2005/0093982 A1 | 5/2005 | Kuroki | |

* cited by examiner

DEVICE AND METHOD FOR INSPECTING FAST REPETITIVE EVENTS OF DEFINED DURATION

BACKGROUND

The invention relates to a method for inspecting fast cyclic processes by high frame rate image recording means (high speed video means/high speed camera means).

Such fast cyclic processes occur for instance in production and packaging processes involving several operation sequences (cycles)/minute and/or many short repetitive movements performed in each operation sequence.

During such fast sequences of operations different failures may take place. Such failures can result in part of the production being improper for use or sales and/or require the production process to be interrupted, or can even cause the production to be blocked.

This can involve severe economic losses.

On the other hand a process cycle can also operate in a sub-optimal manner without resulting in noticeable failures but with some loss of time in each cycle which added up for large production volumes can involve a considerable loss in comparison to an optimal situation.

One approach for analysing the defaults and/or optimising a process cycle (other than just a trial and error setting of the operation parameters of the machine) can reside in analysing slow motion images of the process cycle or part of the process cycle. This may be achieved with camera-systems recording the operation sequences at a high "frame rate".

Conventional, known, video systems are not suitable for that purpose as the frame rate of the image recording is totally insufficient, whereas conventional, known, high speed camera systems are prohibitively expensive and do not permit an "on-line", "real time" analysis of the images, i.e. the images can not be reproduced directly on a LCD-screen during the actual inspection.

Conventional high speed camera systems are furthermore often much too large and heavy to be easily used for this purpose, whereas ultra light versions are extremely expensive and anyway still involve the draw back of not allowing "real time" analysis of failures.

Specific attempts have on the other hand been made to adapt known video systems and/or known high speed camera systems to high speed imaging methods for inspection purposes, but such attempts involved rather complex optical or electronic constructions which did not lead to satisfactory practical results.

Thus for instance:
a high speed image pickup camera according to JP 1991.0204670, involving a high speed image input circuit with a high speed output signal therefrom which is submitted to object discrimination and signal conversion for standard video systems;
a high speed imaging method according to JP 2004.254073, involving an imaging lens with a section for splitting the optical path; and
high speed imaging for repetitive processes according to DE 4 429 966, involving a mechanically coupled optical switching system and a laser based sensing unit generating trigger signals feeding a synchronising module, designed to produce half frame signals.

A different approach for providing a motion analysis tool for viewing fast repetitive movements is disclosed in EP 0 351 558. This disclosure proposes the use of a conventional video camera together with strobe illumination of the moving object. A control system provides for capturing a series of video images over a number of cycles, where only one image is captured in a cycle and each successive image is advanced a predetermined step of time in successive cycles so that when the series of images is displayed a slow motion view of the object is provided while the object moves in repetitive motion. The analysis tool thus provides a window wherein the full cycle or only a selected portion of the cycle can be repeatedly viewed. The predetermined steps of time can be varied to increase the resolution.

The inspection method according to this document thus essentially involves the principle of recording successive images (of successive cycles) of the cyclic process, and synchronised slow motion representation of said recorded successive images during the total cycle time of the cyclic process or a multiple thereof.

In this method the slow motion representation thus consists of a recomposed sequence of successive images taken from different cycles, which in certain circumstances constitutes a drawback of the method.

SUMMARY

The present invention aims at overcoming the drawbacks of the various known inspection methods according to the state of the art.

To reach this objective the invention provides a method and a device based on the same general principle as the method according to EP 0 351 558, in which the successive images are however taken from the same, one cycle of the event.

The invention thus provides a device for inspecting fast repetitive events of defined duration, comprising image recording means for recording successive images of the repetitive event, and image reproduction means for providing a synchronised slow motion representation of said successive images of the repetitive event during the total duration of the repetitive event or a multiple thereof, wherein said image recording means comprise high frame rate image recording means for digitally recording a limited burst of successive images of a fraction of one event, and the device comprises software means to provide synchronised image recording of said fraction of one event and slow motion representation of said limited burst of successive images during the total duration of said one event or multiple thereof.

The expression "during the duration of said one event or a multiple thereof" as used in this context covers any duration of time substantially corresponding to or falling within the total duration of the event/cyclic process (or a multiple thereof), whether the reproduction takes place within the actual duration of the event/process cycle (or a multiple thereof) during which it is being/has been recorded, or during the event/process cycle(s) following immediately thereafter, or with a time delay which is relatively short with respect to the (short) cycle time, i.e. with a delay corresponding to at most 1-3 cycle periods.

In particular for very short cycle times (0.1-2 seconds) it may be appropriate, in accordance with the invention, to reproduce the recorded burst of a fraction of one process cycle, during a multiple of the cycle time of the cyclic process (i.e. during "multiple cycles" involving up to 10 cycles). It should also be observed that the representation/reproduction of the recorded burst is "synchronised" with the process cycle of the repetitive event, but the reproduction time is not necessarily "coupled" to the process cycle time. In may thus be acceptable or even appropriate to include a short "pause" separating the reproduction of successive recorded bursts.

The principle of this "delayed/real time" synchronised slow motion representation of a fraction of the cyclic process (recorded as a so called "burst" of images of said cycle fraction) is illustrated in FIG. 1 of the attached drawings.

In this way it is possible to reproduce and analyse the critical part of the process cycle in real time, i.e. in a direct observation of the failures at the moment when they occur.

The expression "high frame rate recording means" as used in the present text refers to image recording means capable of recording images at a speed ranging from 100 to 5.000 frames per second, and includes (without being limited to) high speed video means/high speed camera means satisfying said criteria.

In a preferred embodiment of the invention, said software means specifically involve an adjustable triggering signal for the coordinated image recording and slow motion representation.

Most preferably the software means provide for an internal trigger for the coordinated image recording, but the software means may also suitably be provided to be triggered by an external trigger signal to control the coordinated image recording, According to the invention the device may also be provided to involve both embodiments, selectively useable by the operator of the device, as appropriate.

According to further preferred features of the inspection device of the invention the device is entirely autonomous and comprises optical means and sensor means for digital imaging, (autonomous) display screen means, (autonomous) memory means, and/or (autonomous) lighting means; whereas said autonomous memory means may more in particular comprise removable/exchangeable memory means, such as a "flash card" memory means or similar exchangeable memory support means.

said sensor means for digital imaging (imaging sensor means) may in particular be selected from Charged Coupled Device (CCD) sensors, or from Complementary Metal Oxide Semiconductor (CMOS) sensors;

said display screen means (display means) may in particular be selected from LCD-display means or O-led display means.

In this context the electronic components referred to as CCD sensors consist of sensor means for digital imaging comprising a plurality (millions) of sensitive cells (pixels), comparable to "solar cells", converting light in an electric signal. These analogous signals are converted to digital values. The pixels possess high reliability and conductivity, so that the signals can be transported without distortion.

The electronic components referred to as CMOS sensors consist of sensor means for digital imaging which can be produced easier and cheaper and which consume less power than CCD sensors. Currently, the quality, durability and reliability is in general inferior to that of CCD sensors, but the image quality is better, in particular in respect of the proportion of "noise".

In a most preferred embodiment of the device according to the invention, said software means are provided for recording a burst (Rt) of 5 to 250 msec comprising a number of recorded frames (Nrf) between 3 and 200 frames at a frame recording frequency between 100 and 1000 frames/sec, and for reproducing said recorded burst as a slow motion representation during a time (Cms) ranging from 0.1 to 5 seconds corresponding to the duration of said repetitive event of defined duration, or a multiple thereof, at a reproduction frame frequency (Rff) ranging from 16-60 frames/sec; most specifically to the device is provided for a number of recorded frames ranging from 5 to 50 frames.

According to still further features of the invention, the inspection device (inspection "camera") according to the invention should be useable for various situations and for various production line circumstances.

The most preferred device according to the invention is thus
- "hand-held"
- easily transportable
- easily installable and dismountable
- easily "adaptable" to any type of production machines to be inspected (preferably without connecting cables—cf. internal triggering versus external triggering)
- possibility of autonomous power supply (such as (rechargeable) batteries)
- involve a reasonable cost price
- implement a most essential (innovative) "point and see" concept of an inspection camera, rather than a "point and shoot" operation (according to state of the art methods) involving a postponed viewing of the recorded images The invention also relates to a method for inspecting fast repetitive events by recording successive images of the repetitive event and providing a synchronised slow motion representation of the recorded successive images of the repetitive event during the total duration of the repetitive event or a multiple thereof, where the method involves high frame rate image recording of a limited burst of successive images of a fraction of one event, and synchronised slow motion representation of said limited burst of successive images during the total duration of said one event or multiple thereof.

In a preferred embodiment of the method according to the invention, the high frame rate image recording of said burst of images of a fraction of one event and said synchronised slow motion representation of said burst are controlled by an adjustable triggering signal.

Most preferably said adjustable triggering signal is an adjustable internal repetitive triggering signal, in which case the starting time for reproducing the recorded images (Str) is calculated from the triggering signal in function of the process cycle time (Cms).

The adjustable triggering signal may however also suitably consist of an adjustable external triggering signal for the software controlling the coordinated image recording.

In a further, also preferred embodiment of the invention, the method involves a total process cycle time (Cms, expressed in milliseconds) ranging from 0.1 to 5 seconds (100-5000 millisecods), a slow motion representation of a fraction of the process cycle ranging from 5 to 250 msec, recorded as a time burst (Rt), comprising a number of recorded frames (Nrf) ranging from 5 to 200 frames (most preferably from 5 to 50 frames), at a frame recording frequency (Frf) ranging from 100 to 5000 frames/sec, whereas the slow motion representation involves a reproduction frame frequency (Rff) ranging from 16-60 frames/sec.

According to preferred features of this embodiment of the invention, the process cycle time (Cms), the recorded burst time (Rt), the number of recorded frames (Nrf), the frame recording frequency (Frf) and the reproduction frame frequency (Rff) are linked by the following formulae $$Rt = k \cdot Cms * Rff/Frf \text{ ms},$$

in which k is a factor expressing the number of process cycles during which the record burst (and optionally a short "separation pause") is reproduced, $$Nrf = Rt * Frf$$

and $$Nrf = k \cdot Cms * Rff$$

Further features and details of the invention will be explained in the following detailed description of a specific, non limiting example of the invention.

DETAILED DESCRIPTION OF EXEMPLARY EMBODIMENTS

In this specific embodiment of the method/device according to the invention real time images of a part of the fast process sequence are reproduced in slowed down version during exactly the duration of the total process cycle (or a multiple thereof).

Figure 1:
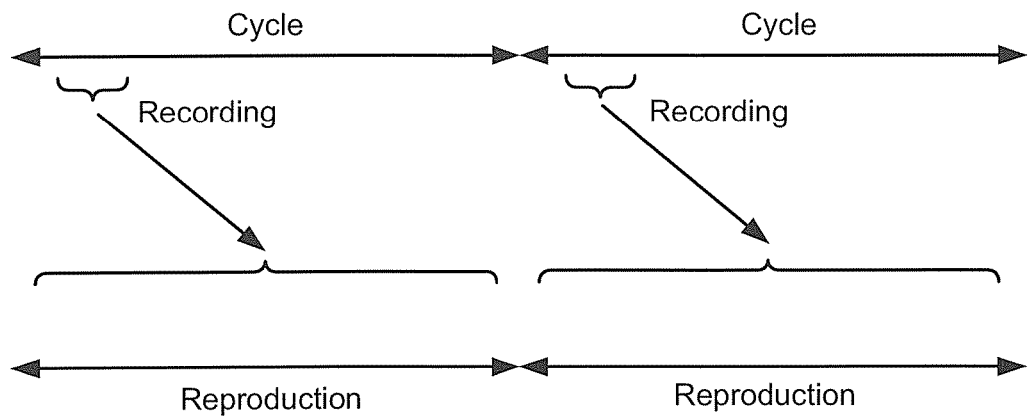
Fig. 1 is an illustration of delayed/real-time synchronised slow motion representation of fraction of a cyclic process.
Figure 2:
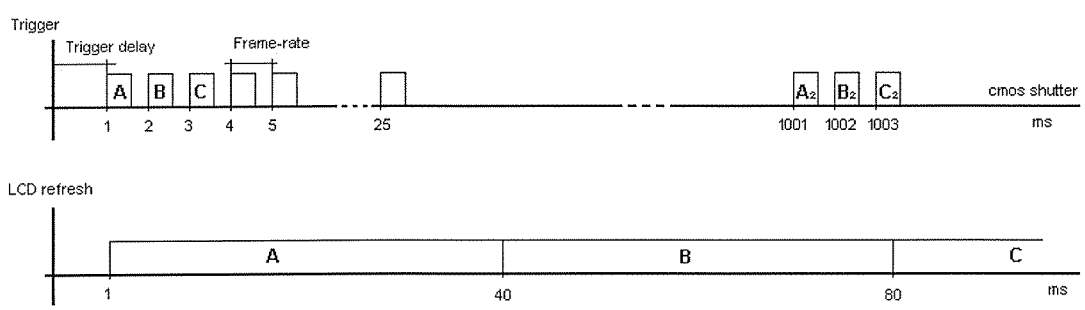
FIG. 2 is a timing diagram for reproducing a subset of captured frames of a cyclic process.

This principle is illustrated in more detail in FIG. 2 of the drawings.

The purpose is that after an external triggering signal, or an internal clock pulse, a defined number of pictures (frames), for instance 25 pictures, are recorded at a defined rate (Frf), for instance at a rate of 1000 fps (frames per second).

Using a "scroll wheel" the start pulse can be moved along the entire cycle time of the machine to be inspected. Defined number of pictures is than reproduced at a defined rate (Rff), for instance of 25 fps, on the display means (LCD-screen) of the device. This produces a repeating slow-motion image of the relevant part of the fast process.

Only the limited, defined number of slow motion pictures are saved in the memory of the system which constitutes an essential difference with respect to most high speed camera systems.

Any (optional) USB or Ethernet connection on the device according to the invention only serves for possible (additional/separate) analysis of the images on a PC.

The purpose of the system is merely a detailed visual inspection of the process part, without any need for in dept analysis of the images themselves.

In this specific embodiment of the method/device according to the invention internal triggering is used, so that no connection to the production machine is needed to start the recording of the images. This internal triggering ensures that the recording periods remain perfectly parallel/synchronised with the process cycle which is being inspected. The software of the method involves means by which the operator can achieve certain adaptations of operation parameters of the device/method according to the invention without interfering with the internal triggering. The method/device comprises, as alternative, the possibility of using an external triggering, in particular for inspecting production processes involving irregular cycles.

The method/device involves a user interface by which the recording cycle, the trigger-delay and the frame rate can be controlled.

The cycle of cyclic machine processes is generally expressed in "strokes/minute" (CM).

The cycle time (Cms), expressed in milliseconds is related to CM through the formula: $Cms=60000/CM$ Thus, for instance, a machine performing at 240 strokes per minute operates 4 strokes per second, involving a cycle time of 250 msec Given the time of the first image to be taken (First Shot (FS) as defined or calculated), and given the trigger delay TD (as a device constant) the proper start pulse delay (SPd) for the recording time burst is defined.

To move forward or backward the fraction of the process cycle to be inspected, the user can advance or delay the time of the first shot FS by means of, for instance, a scroll wheel acting on this start pulse delay (according to the formula $SPd=FS-TD$).

The length of the recording time (burst time) is defined by $$Rt = k \cdot Cms * Rff/Frf \text{ msec}$$

whereas the number of frames is defined by $$Nrf = Rt * Frf = k \cdot Cms * Rff$$

In order to achieve a continuous, flowing slow motion image the number of recorded frames Nrf to be reproduced during the cycle time Cms (or a multiple thereof) must be an integer. This can be adjusted by adjusting the frame recording frequency Frf, by means of, for instance, a scroll wheel.

For the specific example referred to above, involving a cycle time Cms of 250 ms and a frame recording frequency of 1000 frames/sec, one would in this way arrive at an optimal recording burst time of 25 ms for a reproduction frame frequency of 25 frames per second.

The number of frames recorded and memorised for delayed reproduction is thus 25 frames to illustrate the fraction of the process to be inspected, and reproduced during a multiple of the cycle time of 0.25 sec, namely during 1 second corresponding to 4 cycles, with k=4.

The invention claimed is:

1. A device for inspecting a cyclic process of defined duration, comprising:
   an image recording device for recording images of a cycle of the cyclic process, and
   an image reproduction device for providing a repeated synchronized slow motion representation of said images during the cycle or a multiple thereof,
   wherein said images are a limited burst of images corresponding to the same event of the cycle.

2. The device according to claim 1, wherein said device for inspecting a cyclic process generates an adjustable triggering signal for coordinated image recording and slow motion representation.

3. The device according to claim 2, wherein said device for inspecting a cyclic process provides for an internal trigger for the coordinated image recording.

4. The device according to claim 2, wherein said image recording device is triggered by an external trigger signal to control the coordinated image recording.

5. The device according to claim 1, wherein said device comprises an optical device and a sensor device for digital imaging, a display screen, and a memory device.

6. The device according to claim 5, wherein said memory device comprises removable or exchangeable memory.

7. The device according to claim 5, wherein said sensor device for digital imaging comprises one or more Charged Coupled Device (CCD) sensors.

8. The device according to claim 5, wherein said sensor device for digital imaging comprises one or more Complementary Metal Oxide Semiconductor (CMOS) sensors.

9. The device according to claim 1, wherein said image recording device records a burst (Rt) of 5 to 250 msec comprising a number of recorded frames (Nrf) between 3 and 200 frames at a frame recording frequency between 100 and 1000 frames/sec, and said image reproduction device provides said recorded burst as a slow motion representation during a time (Cms) ranging from 0.1 to 5 seconds corresponding to the duration of said cycle, at a reproduction frame frequency (Rff) ranging from 16-60 frames/sec.

10. The device according to claim 9, wherein the burst of frames comprises 5 to 50 frames.

11. The device according to claim 1, further comprising lighting means.

12. A method for inspecting a cyclic process of defined duration, the method comprising:
   recording images of a cycle of the cyclic process; and
   providing a repeated synchronized slow motion representation of the recorded images of the cycle during the cycle or a multiple thereof,
   wherein said recording comprises recording a limited burst of images corresponding to the same event of the cycle.

13. The method according to claim 12, wherein said recording of said burst of images of a portion of the cycle and said synchronized slow motion representation of said burst are controlled by an adjustable triggering signal.

14. The method according to claim 13, wherein said adjustable triggering signal is an adjustable internal repetitive triggering signal.

15. The method according to claim 14, wherein a starting time for providing the synchronized slow motion representation of the recorded images (Str) is calculated based on the triggering signal and a cycle time (Cms) of the cyclic process.

16. The method according to claim 13, wherein said adjustable triggering signal is an adjustable external triggering signal.

17. The method according to claim 12, wherein a total process cycle time (Cms) of the cyclic process ranges from 0.1- to 5 seconds,
   wherein the providing of the synchronized slow motion representation of the burst of images recorded during a time burst (Rt) ranges from 5 to 250 msec,
   wherein the burst of images comprises a number of recorded frames (Nrf) ranging from 5 to 200 frames, which are recorded at a frame recording frequency (Frf) ranging from 100 to 5000 frames/sec, and
   wherein the providing of the synchronized slow motion representation comprises reproducing the recorded images at a reproduction frame frequency (Rff) ranging from 16-60 frames/sec.

18. The method according to claim 17, wherein the number of recorded frames (Nrf) ranges from 5 to 50 frames.

19. The method according to claim 17, wherein the process cycle time (Cms), the recorded burst time (Rt), the number of recorded frames (Nrf), the frame recording frequency (Frf) and the reproduction frame frequency (Rff) are linked by the following formulae $$Rt = k \cdot Cms * Rff/Frf \text{ ms},$$

in which k is a factor expressing the number of process cycles during which the record burst (and optionally a "separation pause") is reproduced, $$Nrf = Rt * Frf$$

and $$Nrf = k \cdot Cms * Rif.$$

20. The device according to claim 1, wherein the limited burst of images of a portion of the cycle comprise successive images of the portion of the cycle.

21. The method according to claim 12, wherein the limited burst of images of a portion of the cycle comprise successive images of the portion of the cycle.

22. A device for inspecting a cyclic process of defined duration, comprising:
   an image recording device for recording images of a cycle of the cyclic process, and
   an image reproduction device for providing a repeated synchronized slow motion representation of a limited burst of said images, corresponding to the same event of the cycle, during each cycle or a multiple thereof.

23. The device according to claim 1, further comprising a processor that controls the image reproduction device to provide the synchronized slow motion representation of said images during each cycle or a multiple thereof.

24. A method for inspecting a cyclic process of defined duration, the method comprising:
   recording images of a cycle of the cyclic process;
   providing a synchronized slow motion representation of a limited burst of said images corresponding an event of the cycle during the cycle or a multiple thereof; and
   repeating the recording and providing steps for a next cycle of the cyclic process.

* * * * *